E. M. STAPLES.
SPRING SHACKLE FOR VEHICLES.
APPLICATION FILED AUG. 24, 1916.
1,222,248.
Patented Apr. 10, 1917.
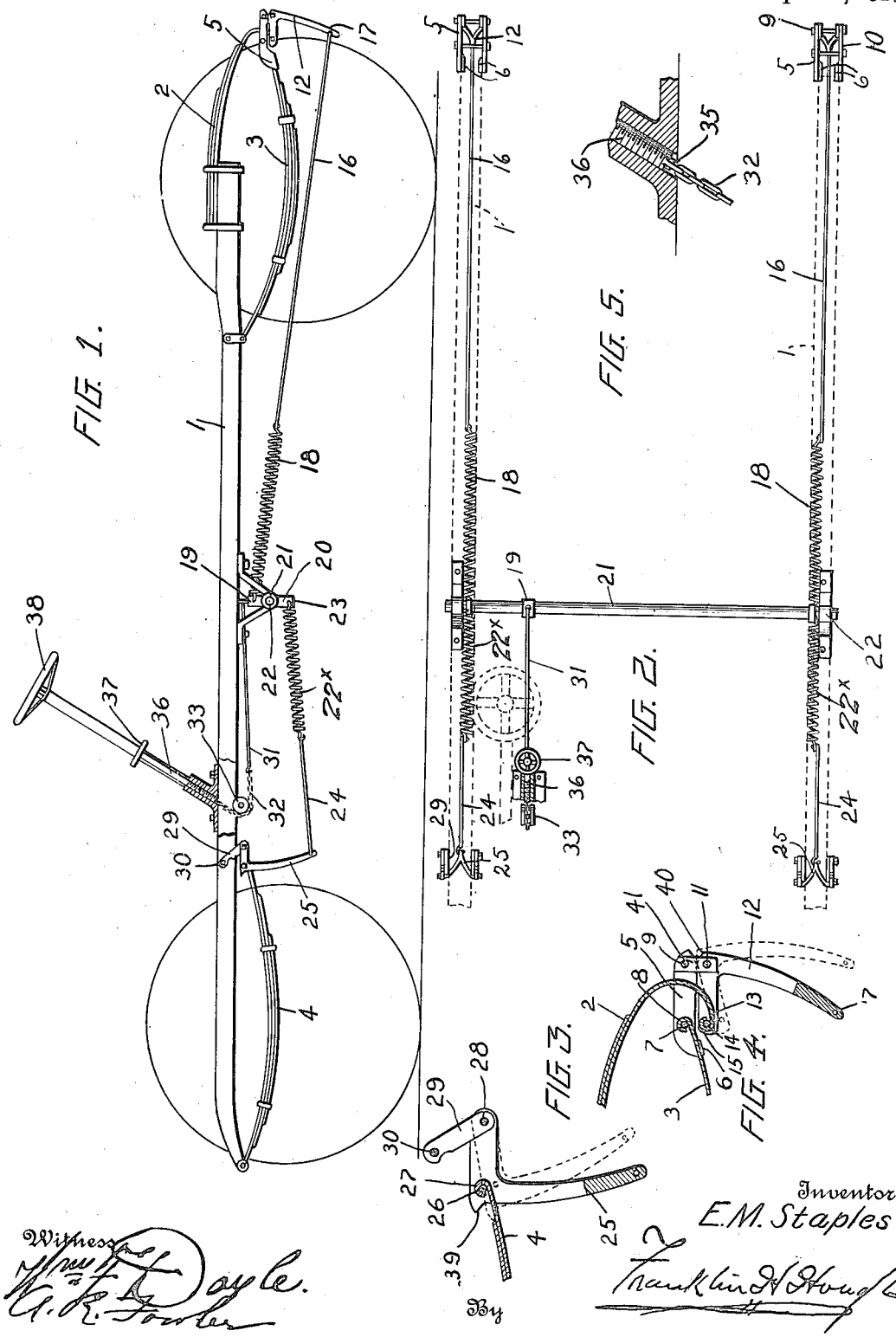
Inventor
E. M. Staples

UNITED STATES PATENT OFFICE.

ELIAL M. STAPLES, OF ELIZABETH, NEW JERSEY.

SPRING-SHACKLE FOR VEHICLES.

1,222,248.   Specification of Letters Patent.   Patented Apr. 10, 1917.

Application filed August 24, 1916. Serial No. 116,660.

*To all whom it may concern:*

Be it known that I, ELIAL M. STAPLES, a citizen of the United States, residing at Elizabeth, in the county of Union and State of New Jersey, have invented certain new and useful Improvements in Spring-Shackles for Vehicles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in adjustable shackles for vehicles of various kinds and the object in view is to produce a simple and efficient mechanism of this character for adjusting the tension of the springs through the manipulation of mechanism convenient to the driver of the vehicle.

The invention consists further in the provision of a simple and efficient mechanism of this nature having various details of construction, combinations and arrangements of parts which will be hereinafter fully described, shown in the accompanying drawings and then specifically defined in the appended claims.

I illustrate my invention in the accompanying drawings, in which:—

Figure 1 is a side elevation of the truck of a vehicle showing the application of my invention thereto.

Fig. 2 is a top plan view of the construction shown in Fig. 1.

Fig. 3 is an enlarged detail view, partially in section, of the front shackle mechanism.

Fig. 4 is a similar view of the rear shackle.

Fig. 5 is a detail sectional view through a part of the invention.

Reference now being had to the details of the drawings by numeral, 1 designates the chassis of an automobile and 2 and 3 designate the semi-elliptical springs at the rear, and 4 the semi-elliptical springs at the forward end of the chassis. Two extension plates, designated by numeral 5, have lateral extensions 6 at corresponding ends which are adapted to extend underneath and form a bearing against the springs 3. Shackle bolts 7 pass through the two plates 5 and also through the eye 8 of the spring 3, forming a support for the rear end of the spring and each plate 5 receives, near its outer end, a second shackle bolt 9 which supports the two plates 10, shown in top plan view in Fig. 2 of the drawings, and which plates, at their lower ends, carry a bolt 11 which has pivotal connection with the forked ends of the bell crank 12. The forward end of the bell crank is apertured as at 13 for the reception of a bolt 14 which passes through the eye 15 formed at the end of the semi-elliptical spring 2. A rod 16 is pivotally connected at one end to the bell crank at 17 and its forward end is connected to a coiled spring 18 which in turn is pivotally connected at 19 to a bar 20 fixed to the rock shaft 21, which latter is journaled in suitable bearings 22 fastened to the under side of the side rails 1. A second coiled spring, designated by numeral $22^x$, is fastened at 23 to one end of the bar 20 and its other end fastened to a rod 24 which in turn is connected to a forward bell crank 25. Said bell crank 25 is substantially of the same construction as the bell crank 12 but is positioned reversely to the bell crank 12 above referred to. A bolt 26 passes through an aperture in the bell crank 25 and has pivotal connection with the eye 27 in the spring 4. Each bell crank is pivotally connected, through the medium of a bolt 28, to the shackle plate 29 which in turn is pivotally connected to the side rail through the medium of the bolt 30. Upon reference to Fig. 2, it will be noted that there are two sets of bell cranks, of similar construction and connected to coiled springs, identically in the same manner, one upon either side of the frame.

A rod, designated by numeral 31, is connected to the upper end of the plate 20 and its forward end is connected to a chain 32 which passes over a pulley 33 upon the side rails and which chain is connected to a nut 35, movable upon the screw 36 having a hand wheel 37 positioned at any suitable location near the driving wheel 38.

While I have shown a particular construction of means for rocking the shaft 21, consisting of the hand wheel 37, it will be understood that I do not confine myself to any particular mechanism but illustrate the construction shown as a convenient means.

Upon reference to Fig. 3 of the drawings, it will be noted that the bell crank 25 has a projecting lug 39 formed thereon and which is adapted to contact with the spring 4 in the manner shown in dotted lines for the purpose of limiting the movement of the bell crank in the event of a sudden jar being imparted to the vehicle as would be the case when passing over an obstruction or hollow road.

Upon reference to Fig. 4, it will be noted that the bell crank 12 has a cutaway portion 40 at angle which coöperates with a beveled or cut away portion 41 upon the shackle plate 5 for a similar purpose for limiting the swinging movement of the bell crank 12 at the rear end of the vehicle.

In operation, the springs 18 and 22 are put under tension by the manipulation of the hand wheel 37, causing the shaft 21 to rock in its bearings and the greater the tension upon the coiled springs the greater the load required to operate the same. By the provision of the adjusting means within convenient reach of the driver, the tension of the springs 18 and 22 may be easily and quickly regulated, accordingly as it may suit the convenience of the persons riding in the vehicle equipped with the apparatus.

What I claim to be new is:—

1. In an adjustable shackle mechanism for vehicles having forward and rear leaf springs, a bell crank connected to the forward spring and having pivotal link connections with the vehicle frame, a bell crank connected to the rear spring and having pivotal connection with another rear spring, auxiliary springs attached to said bell cranks, and means for regulating the tension of said auxiliary springs.

2. An adjustable shackle connected to the springs of a vehicle for varying the tension of the springs, a rock shaft with spring-pressed connections between the same and the shackle, and means for rocking the shaft.

3. An adjustable shackle connected to the springs of a vehicle for varying the tension of the springs, a rock shaft, a bar secured to the rock shaft, springs connecting said bar with the shackle, and means for rocking the shaft.

4. An adjustable shackle connected to the forward and rear springs of a vehicle, a part of each shackle means comprising bell cranks, each having arms of different lengths, a rock shaft, spring-actuated connections between the same and the longer arm of each bell crank, and means for rocking the shaft.

In testimony whereof I hereunto affix my signature in presence of two witnesses.

ELIAL M. STAPLES.

Witnesses:
A. L. HOUGH,
FRANKLIN H. HOUGH.